United States Patent Office 3,445,183
Patented May 20, 1969

3,445,183
FEEDING SOLIDS TO A FLUIDIZED REACTION ZONE
Edward L. Cairns, Newark, Del., assignor to E. I. du Pont de Nemours and Company, Wilmington, Del., a corporation of Delaware
No Drawing. Filed May 9, 1966, Ser. No. 548,384
Int. Cl. C01g *49/10, 23/02;* C01b *9/00*
U.S. Cl. 23—87                                                4 Claims

ABSTRACT OF THE DISCLOSURE

The procedure, in conjunction with a continuous process for chlorinating finely divided titaniferous ore with chlorine using fluidized practice and a superatmospheric pressure, of feeding to the fluidized reaction bed a slurry of volatile chlorinating liquid such as titanium tetrachloride, carbon tetrachloride, phosgene, thionyl chloride, sulfur-monochloride and mixtures thereof, and solid titaniferous ore such as ilmenite, and the reducing agent.

---

This invention relates to the manufacture of volatile metal halides, and more particularly to the production of anhydrous metal chlorides, especially titanium tetrachloride through the chlorination of oxidic metal-containing substances in the presence of a reducing agent and while the reactants are in fluidized suspension.

More specifically, the invention provides a unique, effective method for continuously introducing with accompanying more accurate control over the metering operation and without interrupting the chlorination process, finely divided or powdered solid reactants such as a titaniferous ore and coke, into a chlorination furnace of a fluidization process, by slurrying said reactants, prior to their introduction in a volatile, inert liquid such as titanium tetrachloride.

In the manufacture of volatile metal halides, such as $TiCl_4$, $AlCl_3$, $AlBr_3$, $SiCl_4$, $SnCl_4$, etc. by means of fluidized bed techniques, a mixture of the solid oxidic reactant, for example, a titanium metal-containing susbtance such as a titaniferous ore (ilmenite or rutile), $TiO_2$ slags or concentrates, etc., and a carbonaceous reducing agent, such as carbon, coke or coal, are fed to the reaction zone of a vertical, elongated shaft or other type of furnace or reactor in dry, powdered state and while suspended in the chlorine or other halogenating gas, and reaction therebetween at elevated temperatures is undertaken while the reactants are in fluidized suspension. Thus, U.S. Patent 2,701,179 discloses the chlorination of ilmenite at temperatures above 700° C. and up to about 1250° C., and preferably from 850–1000° C., by feeding a powdered mixture of ilmenite and coke into the furnace and by entraining the ore and coke in the chlorinating gas being charged upwardly through the reactor. In the process a 1:5 ratio by weight of reducing agent to ore is preferred for use, but ratios of from 1:2 to 1:6 by weight also can be employed. A gas feed of not less than 40 feet per second to entrain the solids is employed and to maintain them in bubbling bed suspension within the reaction zone an upward gas flow of about .1–10 feet per second and preferably from 0.2–2.0 feet per second is resorted to. By suitably regulating the rate of introduction of ore, carbon and chlorine into the reactor desired maintenance of and control over the reaction temperature can be obtained. Resulting $TiCl_4$-$FeCl_3$ reaction products are removed from the upper portion of the reactor and are passed to an associated cyclone and thence to a condensing and separation system to recover the $TiCl_4$.

Various expedients for feeding dry reactant solids to a fluidized bed reactor have already been proposed. These include screw feeders, star valves, stand pipes, gas injection, etc. (note U.S. Patents 2,242,257; 2,245,076; 2,104,-741; 2,183,365; 2,275,565 and 2,184,887). When attempts are made to continuously add such solids by these expedients, considerable difficulties are encountered for which no ready mechanical solution has been found to exist. In pressure chlorination operations the reactor is maintained at pressures above 10 p.s.i.g. Because of the pressure fluctuations which occur in the reactor at the feed port and the porous nature of the dry particulate solids being injected into the reactor, an undesired solids backflow with improper, uneven metering of solids takes place. This results in an undesired lack of an adequate seal being developed between the internal physical conditions of the reactor and the atmosphere together with loss of operational efficiency. In commercial operations where tonnage quantities of solids are metered into the reactor each hour and proper reactant flow and material balance is necessary and of prime importance to an economical system, these difficulties are very deleterious because of the undesired imbalance and lack of control they exert on the halogenation or chlorination operation.

It has now been found that these difficulties and disadvantages attending prior anhydrous metal halide production and feeding of solid reactants to a fluidized bed can be effectively overcome by this invention which provides (1) a unique and efficiently continuous process for more accurately controlling and metering finely divided solid reactants charged to a fluidized reaction zone in which reaction of said reactants with a halogenating or chlorinating agent is carried under an elevated temperature and pressure above atmospheric; (2) a continuous method for adding a solid, finely divided reducing agent, such as coke, together with a finely divided ore or like metal-containing material to a fluidized bed in a reaction zone to produce transition metal halides; and (3) an improved method for continuously producing titanium tetrachloride through a controlled, accurate feeding of powdered coke and ilmenite into a chlorination furnace for reaction at an elevated temperature and pressure, with said feeding being effected while the coke and ilmenite are slurried and suspended in a volatile inert liquid which preferably consists of titanium tetrachloride.

In applying the invention to the continuous production of titanium tetrachloride in a method and apparatus such as disclosed in U.S. Patent 2,701,179, a preheated, dry mixture of powdered or finely ground carbonaceous reducing agent and titaniferous ore is charged to a closed, elongated pressurized reactor vessel and fluidized therein as a bubbling bed of substantial depth by passing a gaseous stream upwardly through the reactor and mixture. The concentration of reducing agent present ranges from about 10–35% and preferably is from about 15–30% by weight, based on the ore. Following solids addition and formation of the bed the latter is adjusted to contain, preferably, about one part of carbon or coke to about 4–5 parts of ilmenite or rutile. Gaseous chlorine is then continuously admitted via a separate reactor inlet for upward flow at a controlled rate through the bed and reactor and chlorination is undertaken at a temperature in excess of 600° C. and preferably at from 850–1050° C. The reaction is self-sustaining due to the heat generated as a result of the ore conversion. Subsequent, continuous introduction of the required amounts of reducing agent and ore are effected by charging stoichiometric amounts of such reactants as a liquid slurry containing from between 30 and 70% liquid $TiCl_4$ by volume, by pumping the slurry into the reactor at velocities high enough to prevent solids settling into the suction side of the rotor or other pumping means employed. Reaction products (TiCl$_4$ and FeCl$_3$-containing gases) evolved in the reaction are withdrawn continuously from the upper part of the reactor and passed into an associated cyclone for discharge from the system to associated condensing equipment wherein separation, purification and recovery of said reaction products is brought about.

To a clearer understanding of the invention the following specific examples are given. These are merely illustrative of particular embodiments of the invention and are not to be considered as limiting its underlying principles and scope.

EXAMPLE I

A feed slurry mixture consisting of approximately 30% liquid titanium tetrachloride and 70% by volume of powdered solids comprising ilmenite ore and coke in stoichiometric quantities are formed at ambient temperature under continuous agitation in a closed storage vessel. This mixture with an approximate solids composition of 7 parts by volume of ilmenite ore and 6 parts by volume of coke is continuously pumped from the bottom of the storage vessel through lines properly sized to give velocities high enough to prevent settling and into the suction side of an inclined rotor pump. The slurry is then discharged through a short nipple (sized to prevent settling) into an associated vertical reactor with the introduction being effected at a point just above the top of a fluidized bed of finely divided ilmenite and coke held in suspension by means of air and chlorine gases and undergoing reaction under a pressure of 20 p.s.i.g. at a temperature of about 950° C. In the operation a pumping rate of 23 gallons per minute of TiCl$_4$, 31,000 pounds per hour of ilmenite and 7,000 pounds per hour of coke was employed to continuously deliver the slurry to the reactor. By controlling the exact composition and percent solids in the feed slurry, the concentration of furnace off gases and reaction temperature were controlled at the desired valves. In addition and in contrast with prior feeding operations in which ordinary dry solid feed is charged to the reactor accurate and even metering of reactant solids with a tight liquid seal and favorable pressure drop across the feed port was provided and at reactor pressures above 20 p.s.i.g.

EXAMPLE II

Example I was duplicated except that an amount of 5% liquid carbon tetrachloride and phosgene by volume was added to the liquid TiCl$_4$-solids feed and such feed was introduced into the reactor at a point 3 feet from the bottom of the fluidized bed.

EXAMPLE III

Example I was duplicated except that ilmenite ore and coke were slurried in carbon tetrachloride to a concentration of 50% by volume and such slurry was introduced into a fluidized bed of rutile ore and coke maintained in fluidized state in the reactor by means of preheated air.

A primary function of the inert volatile slurrying liquid outside the reaction zone and furnace is to impart and insure a liquid seal in addition to a mechanical seal between the interior of the fluidized bed within the reaction zone and the reactants supplied from the storage vessel. Once these reactants are conveyed into the reactor via such liquid the latter should either (1) vaporize and pass out of the reactor unchanged, (2) remain in the fluidized bed unchanged, (3) react to form a fluid product which will remain in the fluidized bed, or (4) react to form a new vapor or gas which will readily pass out of the reactor with the fluidization and TiCl$_4$ and other reaction product gases being discharged from the reactor. While titanium tetrachloride comprises a preferred slurrying liquid which is volatile and inert under the conditions existing in the chlorination, other chlorine-containing liquids, including those manifesting a chlorinating function under the reaction conditions, and such liquids as carbon tetrachloride (CCl$_4$), phosgene (COCl$_2$), thionyl chloride (SOCl$_2$), sulfur monochloride (S$_2$Cl$_2$) etc. as well as mixtures of said liquids are contemplated for use in the invention.

As noted above, the invention is particularly applicable to and useful in a number of reactions and combinations for feeding solid reactants to a fluidized bed reaction and especially chlorination reaction wherein halides of transition elements are being produced by reacting a mixture of an ore and preferably a solid reducing agent such as carbon or coke (or if desired a gaseous reducing agent such as carbon monoxide) and a halogenating agent such as chlorine, bromine, etc. In these reactions the liquid employed to slurry the solid reactants can act as a halogenating agent as in the case of carbon tetrachloride, phosgene, thionyl chloride or various metal chlorides can be employed in conjunction with the ore to react in the fluidized bed to produce a metal chloride. Advantageously if the furnace temperature should become overheated during the halogenation the reaction temperature can be lowered or cooled by the addition of more of the slurrying liquid, such as TiCl$_4$, or by employing a more dilute slurry and vice versa should the reaction temperature become too low. Coke or other carbonaceous reducing agent rates employed can be varied to control furnace reaction. Similarly production rates can be effectively controlled by varying the ore feed solids charged to the reactor. Among additional advantages afforded through pumping raw reactant materials as a liquid slurry into a fluidized bed reactor the following can be mentioned:

(1) Liquid slurries enable one to pump the reactants into a reactor maintained under an elevated pressure much easier than dry solids can be pneumatically mechanically delivered to the furnace;

(2) Sealing against reactor pressure becomes enhanced;

(3) Lower quantities of inerts can be charged to the reactor system to result in a reduced system pressure drop with less product loss in the inerts stream discharged from the system as tail gas;

(4) Because of the quenching effect afforded by reason of liquid addition with the slurries, less refrigeration will be required in the recovery system with resulting reduction to a minimum of product loss in the tail gas.

If desired air or oxygen can be admitted to the reaction zone to heat such zone to the temperature desired for reaction and also to maintain the reactor at that temperature during the halogenation operation.

While preferably a mixture of the reducing agent, ore and halogenating gas is initially charged into the reaction chamber it will be understood that such materials can be separately introduced therein in forming the fluidized bed. Similarly, while sand type ilmenite can be directly employed as the ore solid in the process, use is preferred of finely ground ilmenite admixed with a solid carbonaceous reducing agent in which from 10 to 30% by weight of coke, based on the weight of the ilmenite is present. Preferably also the solid constituents in the liquid slurry contemplated for use herein have previously been ground to less than 100 mesh size since this type of material more readily fluidizes in maintaining the bed. Obviously other types of solid or gaseous carbonaceous reducing agents can be used and are contemplated for employment in the process.

I claim:

1. In a continuous process for chlorinating solid finely divided titaniferous ore at a temperature ranging from 700° to 1250° C. with chlorine in the presence of a solid carbonaceous reducing agent and while said titaniferous ore and reducing agent are in fluidized suspension in a closed reaction zone maintained at superatmospheric pressure, the improvement which consists essentially of feeding said titaniferous ore and reducing agent to the fluidized bed as a slurry in a volatile liquid selected from the group consisting of titanium tetrachloride, carbon tetrachloride, phosgene, thionyl chloride, sulfur-monochloride and mixtures thereof.

2. The process of claim 1 in which a 10–35% concentration of solids reducing agent by weight, based on the ore is present and the slurry contains from 30–70% by volume of liquid titanium tetrachloride.

3. The process of claim 2 in which the titaniferous ore is ilmenite, the solid reducing agent is coke and the chlorination is carried out under temperatures ranging from 850–1050° C.

4. The process of claim 3 in which ratios of coke to ilmenite ranging from 1:2 to 1:6 by weight are employed and the chlorine reactant gas maintains the bed in fluidized suspension.

References Cited

UNITED STATES PATENTS

| 2,701,179 | 2/1955 | McKinney | 23—87 |
| 2,701,180 | 2/1955 | Krchma | 23—87 |
| 2,855,273 | 10/1958 | Evans | 23—87 |
| 2,868,622 | 1/1959 | Bennett et al. | 23—87 |
| 3,305,300 | 2/1967 | McBrayer | 23—15 |

FOREIGN PATENTS 827,603   2/1960   Great Britain.

EDWARD STERN, *Primary Examiner.*

U.S. Cl. X.R.

23—93, 98, 205